(12) United States Patent
Kim et al.

(10) Patent No.: US 10,321,119 B2
(45) Date of Patent: Jun. 11, 2019

(54) STEREOSCOPIC IMAGE DISPLAY DEVICE

(71) Applicant: LG DISPLAY CO., LTD., Seoul (KR)

(72) Inventors: Hoon Ki Kim, Incheon (KR); Byung Joo Lee, Seoul (KR); Ju Hoon Jang, Paju-si (KR); You-Yong Jin, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 426 days.

(21) Appl. No.: 14/581,279

(22) Filed: Dec. 23, 2014

(65) Prior Publication Data
US 2015/0341623 A1  Nov. 26, 2015

(30) Foreign Application Priority Data

May 26, 2014 (KR) ........................ 10-2014-0063344

(51) Int. Cl.
| | | |
|---|---|---|
| *H04N 13/04* | (2006.01) | |
| *H04N 13/305* | (2018.01) | |
| *H04N 13/31* | (2018.01) | |
| *H04N 13/317* | (2018.01) | |
| *H04N 13/351* | (2018.01) | |
| *G02B 27/22* | (2018.01) | |

(52) U.S. Cl.
CPC ....... *H04N 13/305* (2018.05); *G02B 27/2214* (2013.01); *H04N 13/31* (2018.05); *H04N 13/317* (2018.05); *H04N 13/351* (2018.05)

(58) Field of Classification Search
CPC ........... H04N 13/0409; H04N 13/0447; H04N 13/0415; H04N 13/0404; G02B 27/2214

USPC ....... 348/58, 59; 349/15, 110, 106; 345/214; 359/463
See application file for complete search history.

(56) References Cited

U.S. PATENT DOCUMENTS

| | | | | |
|---|---|---|---|---|
| 2008/0316379 | A1* | 12/2008 | Zuidema | H04N 13/305 349/15 |
| 2009/0021674 | A1* | 1/2009 | Louwsma | G02B 27/2214 349/106 |
| 2011/0050683 | A1* | 3/2011 | Yun | G02B 27/2214 345/214 |
| 2012/0113100 | A1 | 5/2012 | Niioka et al. | |
| 2012/0127320 | A1 | 5/2012 | Balogh | |

(Continued)

FOREIGN PATENT DOCUMENTS

| | | |
|---|---|---|
| CN | 202720346 U | 2/2013 |
| CN | 202975533 U | 6/2013 |

(Continued)

*Primary Examiner* — Jayanti K Patel
*Assistant Examiner* — Richard Carter
(74) *Attorney, Agent, or Firm* — Birch, Stewart, Kolasch & Birch, LLP

(57) ABSTRACT

A stereoscopic image display device is discussed, which may minimize 3D crosstalk and luminance deviation between viewing zones. The stereoscopic image display device can include a display panel that includes a first substrate having a plurality of pixels provided in a pixel region in a curved shape and a second substrate having a plurality of openings respectively overlapped with the plurality of pixels; and a lenticular lens sheet arranged above the display panel, including a plurality of lenticular lenses inclined to be parallel with the openings, wherein each of the plurality of openings is inclined at a slope parallel with one side of each pixel and has a shape different that of the pixel.

21 Claims, 7 Drawing Sheets

(56) References Cited

U.S. PATENT DOCUMENTS

| | | | |
|---|---|---|---|
| 2013/0155357 A1* | 6/2013 | Ota | G02F 1/133512 |
| | | | 349/110 |
| 2014/0029094 A1 | 1/2014 | Kroon et al. | |
| 2014/0111719 A1 | 4/2014 | Sekine | |
| 2014/0168549 A1* | 6/2014 | Murao | G02F 1/134309 |
| | | | 349/15 |
| 2014/0300961 A1* | 10/2014 | Kim | G02B 27/2214 |
| | | | 359/463 |
| 2014/0347725 A1 | 11/2014 | Ohbitsu | |
| 2015/0161939 A1* | 6/2015 | Yang | G09G 5/00 |
| | | | 348/58 |

FOREIGN PATENT DOCUMENTS

| | | |
|---|---|---|
| JP | 2009-519497 A | 5/2009 |
| JP | 2012-63556 A | 3/2012 |
| JP | 2014-85389 A | 5/2014 |
| JP | 2014-517336 A | 7/2014 |
| TW | 201209479 A1 | 3/2012 |
| WO | WO 2012/119466 A1 | 9/2012 |
| WO | WO 2012/143817 A2 | 10/2012 |
| WO | WO 2013/132600 A1 | 9/2013 |

\* cited by examiner

STEREOSCOPIC IMAGE DISPLAY DEVICE

CROSS REFERENCE TO RELATED APPLICATIONS

This application claims the priority benefit of the Korean Patent Application No. 10-2014-0063344 filed on May 26, 2014, which is hereby incorporated by reference for all purposes as if fully set forth herein.

BACKGROUND OF THE INVENTION

Field of the Invention

The present invention relates to a stereoscopic image display device, and more particularly, to a stereoscopic image display device that may minimize 3D crosstalk and luminance deviation between viewing zones.

Discussion of the Related Art

Recently, as realistic images are becoming more in demand, stereoscopic image display devices that display 3D images as well as 2D images are being developed.

2D-image display devices have been greatly advanced in terms of a quality of a display image such as resolution and viewing angle, but have a limitation in that 2D-image display devices cannot display depth information of an image because they are displaying 2D images.

On the other hand, a stereoscopic image display devices display stereoscopic images instead of 2D-planar images, and thus fully transfer original 3D information to a user. Therefore, in comparison with the existing 2D-image display devices, stereoscopic image display devices display far more vivid and realistic stereoscopic images.

Stereoscopic image display devices are largely categorized into glasses type stereoscopic image display devices using 3D glasses and non-glasses type stereoscopic image display devices using no 3D glasses. The non-glasses type stereoscopic image display devices are the same as the glasses type stereoscopic image display devices in the sense that the non-glasses type stereoscopic image display devices provide a three-dimensionality of an image to a viewer by using a binocular parallax. However, since the non-glasses type stereoscopic image display devices do not require wearing the 3D glasses, the non-glasses type stereoscopic image display devices are differentiated from the non-glasses type stereoscopic image display devices.

FIGS. 1 and 2 are diagrams illustrating a method of realizing multi-views in a non-glasses type stereoscopic image display device according to the related art.

Referring to FIGS. 1 and 2, a non-glasses type stereoscopic image display device according to the related art separately displays a left-eye image and a right-eye image through a display panel 10 on which pixels P of red R, green G and blue B are arranged, and splits a stereoscopic image into multi-views through a lenticular lens sheet 20 that includes a lenticular lens 22 arranged on the display panel 10.

The non-glasses type stereoscopic image display device according to the related art displays an image, which corresponds to view maps allocated in accordance with the multi-views, on each pixel P formed on the display panel 10.

The lenticular lens sheet 20 splits images displayed on i number of pixels P included in the lenticular lens 22 into a plurality of viewing zones corresponding to the view maps, thereby enabling a viewer to view the stereoscopic image through the plurality of viewing zones. At this time, the viewer feels three-dimensionality in a given viewing zone through binocular parallax of a left-eye image LI perceived by a left eye and a right-eye image RI perceived by a right eye.

The lenticular lens sheet 20 is arranged on the display panel 10 such that a length direction of the lenticular lens 22 is inclined at a certain angle. This is intended to reduce banding artifact caused as a black matrix (not shown) covering a data line (not shown) formed on the display panel 10 is enlarged by the lenticular lens 22.

The non-glasses type stereoscopic image display device according to the related art has the following problems.

First of all, as the lenticular lens sheet 20 is inclined at a certain angle, 3D crosstalk is generated due to an overlapped image between neighboring viewing zones, whereby display quality of the stereoscopic image is deteriorated.

Also, a problem occurs in that luminance deviation between the viewing zones is high due to un-uniformity of luminance per viewing zone corresponding to the length direction of the lenticular lens 22.

SUMMARY OF THE INVENTION

Accordingly, the present invention is directed to a stereoscopic image display device that substantially obviates one or more problems due to limitations and disadvantages of the related art.

An advantage of the present invention is to provide a stereoscopic image display device that may minimize 3D crosstalk and luminance deviation between viewing zones.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device comprises a display panel that includes a first substrate having a plurality of pixels formed in a pixel region in a curved shape and a second substrate bonded to the first substrate, having a plurality of openings respectively overlapped with the plurality of pixels; and a lenticular lens sheet arranged above the display panel, including a plurality of lenticular lenses inclined to be parallel with the openings, wherein each of the plurality of openings is inclined at a slope parallel with one side of each pixel and has a shape different that of the pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element or additional elements may be interposed between the first and second elements.

Hereinafter, a stereoscopic image display device according to one or more preferred embodiments of the present invention will be described in detail with reference to the accompanying drawings.

Figure 1:
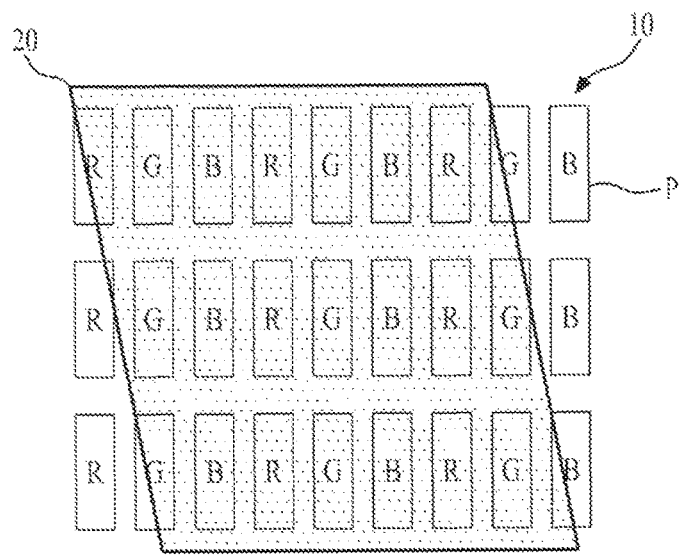
FIGS. 1 and 2 are diagrams illustrating a method of realizing multi-views in a glasses-free stereoscopic image display device according to the related art.
Figure 2:
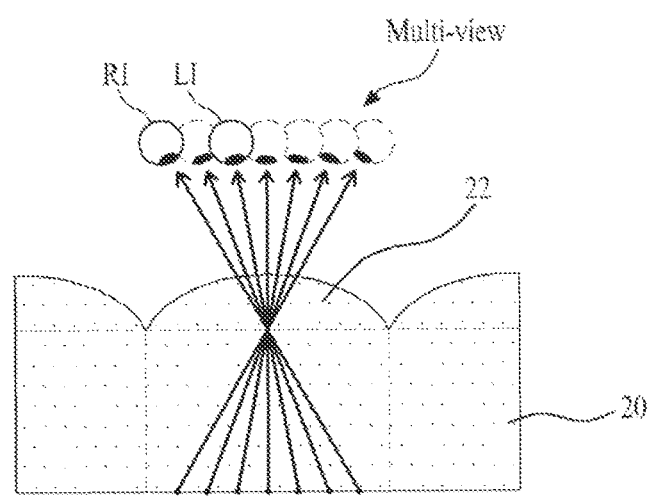
Figure 3:
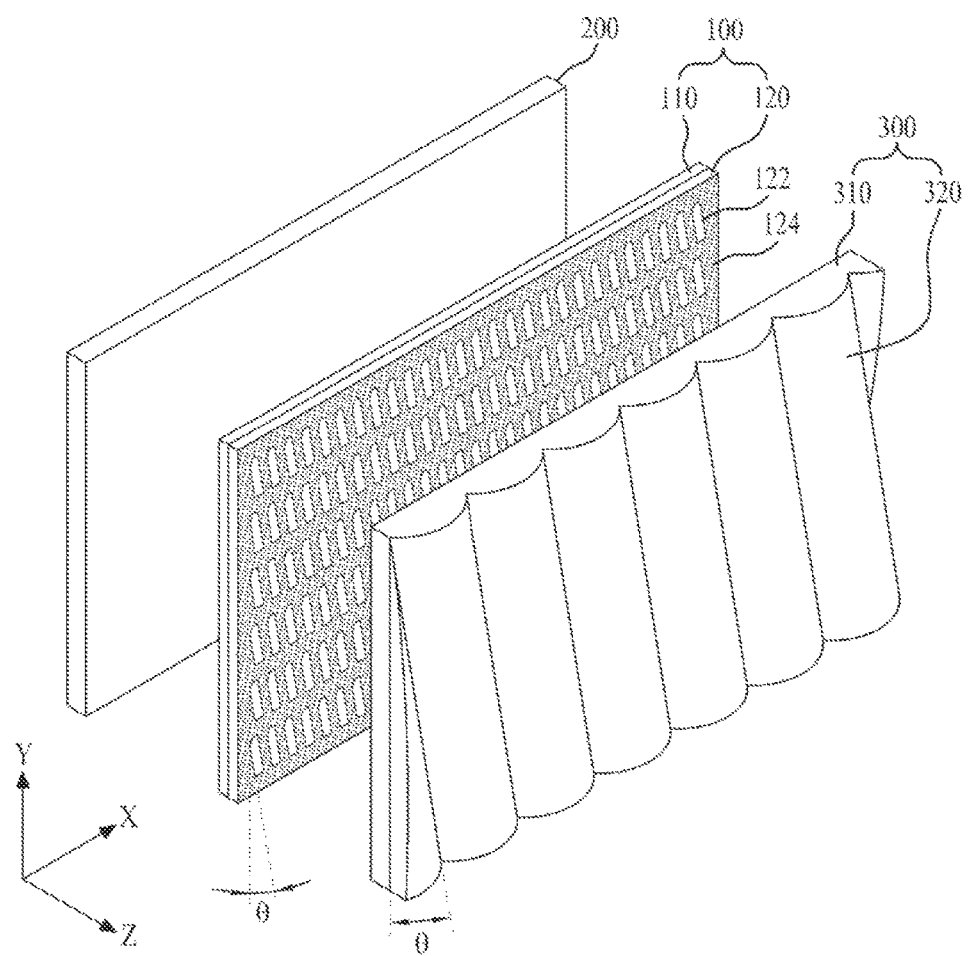
FIG. 3 is a diagram briefly illustrating a stereoscopic image display device according to an embodiment of the present invention.

FIG. 3 is a diagram briefly illustrating a stereoscopic image display device according to an embodiment of the present invention.

Referring to FIG. 3, the stereoscopic image display device according to the embodiment of the present invention includes a display panel 100, a backlight unit 200, and a lenticular lens sheet 300. All components of the stereoscopic image display device in this and other embodiments are operatively coupled and configured.

The display panel 100 includes first and second substrates 110 and 120 bonded to each other with a liquid crystal layer interposed therebetween.

The first substrate 110 is a thin film transistor array substrate that includes a plurality of thin film transistors, and includes a plurality of curved pixels formed in a lattice-shaped pixel region. In this case, view maps set based on the number of multi-views (or viewing zones) are allocated to each of the plurality of pixels.

The second substrate 120 is a color filter array substrate that includes a color filter, and has a shape to minimize 3D crosstalk and luminance deviation per viewing zone and includes a plurality of openings 122 overlapped on each of the plurality of pixels.

Each of the plurality of openings 122 defines an opening region of the corresponding pixel, and is inclined at a slope of θ parallel with one side of the pixel to overlap each of the plurality of pixels, thereby having a shape different from that of the pixel while having an area smaller than that of the pixel. Each of the plurality of openings 122 is defined by a black matrix 124 formed on the second substrate 120. The black matrix 124 is formed on the entire region of the second substrate 120, except for each of the plurality of openings 122.

Also, a color filter layer is formed in each of the plurality of openings 122, and the color filter layer of each opening 122 may be one of red, green and blue color filter layers, which corresponds to the pixel.

The display panel 100 described as above forms the electric field in the liquid crystal layer by supplying a data signal supplied from a panel driver to the corresponding pixel, thereby displaying an image based on the view maps allocated to each pixel by adjusting transmittance of incident light from the backlight unit 200.

The backlight unit 200 is arranged on a rear surface of the display panel 100 and irradiates light towards the display panel 100. The backlight unit 200 irradiates light, which is emitted from a light source such as a fluorescent lamp or light-emitting diode(s), towards the rear surface of the display panel 100.

The lenticular lens sheet 300 is arranged above the display panel 100 and splits an image displayed on the pixel of the display panel 100 into a plurality of viewing zones corresponding to the view maps, thereby allowing a viewer to view a stereoscopic image in the plurality of viewing zones. At this time, the viewer feels three-dimensionality in a given viewing zone through binocular disparity of a left-eye image perceived by a left eye and a right-eye image perceived by a right eye. To this end, the lenticular sheet 300 may include a plurality of lenticular lenses 320 formed in a lens shape from an upper surface of a base film 310.

The plurality of lenticular lenses 320 may be formed to be convex from the upper surface of the base film 310 and extended longitudinally in a given direction to have a pillar shape. For example, the plurality of lenticular lenses 320 may have a cross-section of a convex lens having a semi-circle shape or a given curvature. A length direction of each lenticular lens 320 is inclined at the same angle as the slope θ of each opening 122. That is, the plurality of lenticular lenses 320 are arranged in parallel to have an oblique shape inclined on the display panel 100 at a given slope θ.

A pitch width of the plurality of lenticular lenses 320 is set to correspond to the number of multi-views (or viewing zones) and a size of the pixel, which are realized by the stereoscopic image display device. Additionally, the pitch width of the plurality of lenses 320 is preferably set to become short as much as a fine length towards both ends from the center of the display panel 100. As a result, the present invention may allow the stereoscopic image to be concentrated on the center, thereby increasing image concentration of the viewer.

Figure 4:
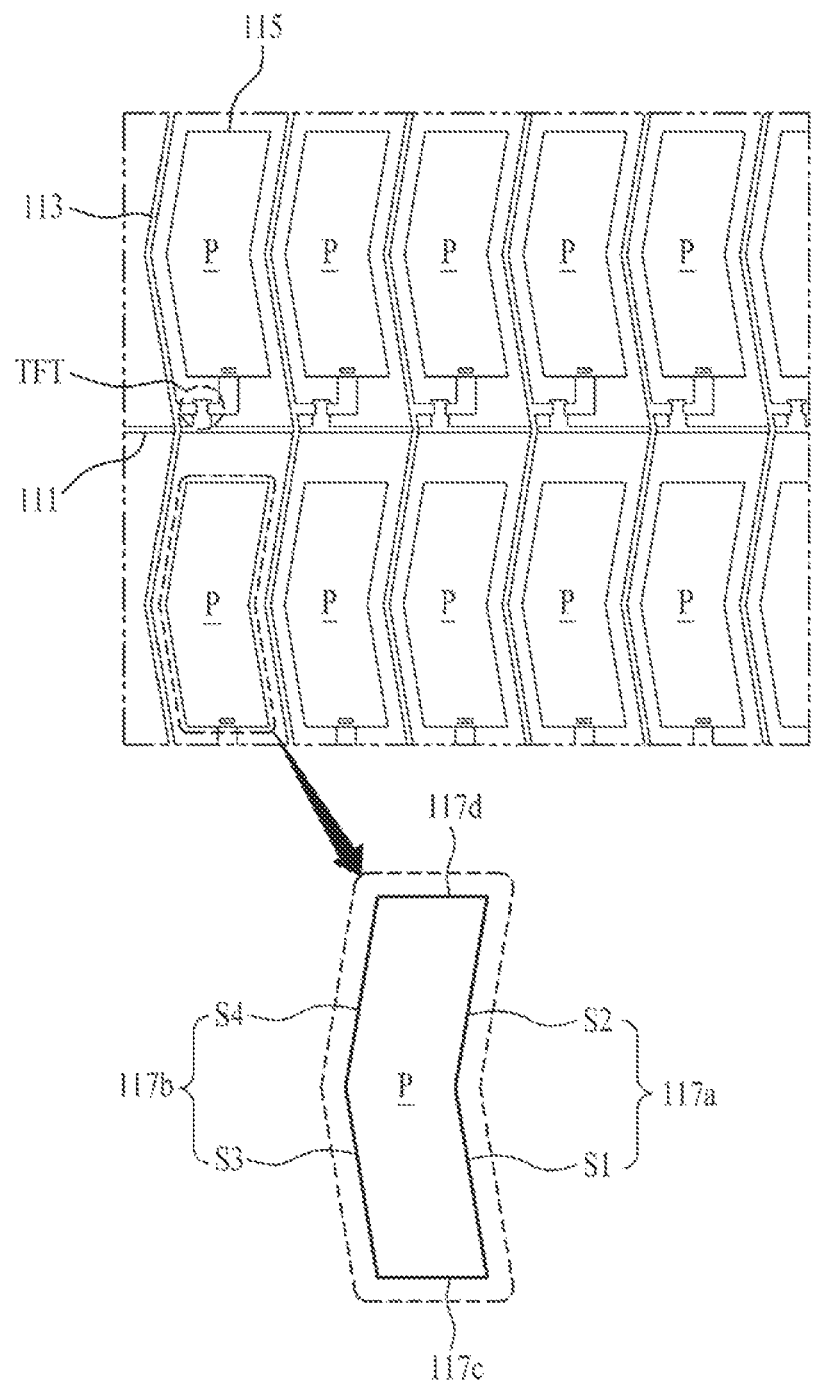
FIG. 4 is a diagram briefly illustrating a first substrate of a display panel shown in FIG. 3.

FIG. 4 is a diagram briefly illustrating an example of the first substrate of the display panel shown in FIG. 3. FIG. 4 can illustrate main elements related to the key point(s) of the present invention, and details of other elements will be omitted.

Referring to FIG. 4, the first substrate 110 according to one example of the present invention includes a plurality of gate lines 111, a plurality of data lines 113, a plurality of thin film transistors (TFTs), and a plurality of pixels P.

The plurality of gate lines 111 and the plurality of data lines 113 are arranged on the first substrate 110 to cross each other, thereby defining a plurality of pixel regions.

The plurality of gate lines 111 are arranged on the first substrate 110 in parallel in a horizontal direction X to have a constant interval, and the plurality of data lines 113 are arranged on the first substrate 110 in parallel in a vertical direction Y to have a constant interval.

Each gate line 111 is formed in a straight line shape, and each data line 113 is once curved to have an obtuse angle in one pixel region. Accordingly, the pixel region defined by crossing arrangement of the gate line 111 and the data line 113 has a curved shape.

The thin film transistor TFT is formed in a transistor region of each pixel region, and is switched in accordance with a gate signal supplied to the corresponding gate line and serves to supply a data signal supplied to the corresponding data line to a pixel electrode 115. Each thin film transistor includes a gate electrode, a semiconductor layer, and source/drain electrodes. The thin film transistor may have a bottom gate structure that the gate electrode is disposed below the semiconductor layer, and may have a top gate structure that the gate electrode is disposed above the semiconductor layer.

Each of the plurality of pixels P includes the pixel electrode 115 connected to the thin film transistor TFT, and a common electrode (not shown).

The pixel electrode 115 is formed in an opening region of each pixel region and connected to the drain electrode of the thin film transistor, and forms the electric field in the liquid crystal layer through the data signal supplied from the thin film transistor. This pixel electrode 115 is once curved in the same manner as the pixel region to form two domains in the pixel region, thereby improving viewing angle property of the pixel P.

The common electrode serves to drive liquid crystal molecules of the liquid crystal layer by forming the electric field together with the pixel electrode 115. At this time, the common electrode may be formed to correspond to an electric field formation system that drives the liquid crystal molecules of the liquid crystal layer. For example, the common electrode may be formed to fully cover the plurality of pixel regions.

Meanwhile, although not shown, the pixel electrode 115 may be provided with a slit therein. In this case, the pixel electrode 115 may have a finger shape. In this way, if the pixel electrode 115 has a finger shape, a fringe field is formed between the pixel electrode 115 and the plate shaped common electrode, whereby the liquid crystal molecules of the liquid crystal layer are driven by the fringe field. That is, the pixel electrode 115 and the common electrode drive the liquid crystal molecules of the liquid crystal layer in accordance with a fringe field switching mode.

On the other hand, although not shown, the pixel electrode 115 and the common electrode may have a finger shape to mutually alternate in the pixel region. In this case, a horizontal electric field is formed between the pixel electrode 115 and the common electrode, whereby the liquid crystal molecules of the liquid crystal layer are driven by the horizontal electric field. That is, the pixel electrode 115 and the common electrode drive the liquid crystal molecules of the liquid crystal layer in accordance with an In plane switching mode.

Each of the plurality of pixels P is once curved to correspond to the formation structure of the pixel electrode 115 or the formation structure of the pixel electrode 115 and the common electrode, and may have a vertical symmetric structure on the basis of the center based on the length direction of the data line 113.

Each pixel P according to one example includes one side 117a once curved at an obtuse angle, the other side 117b having the same shape as that of the one side 117a, spaced apart from the one side 117a at a constant interval in parallel with the one side 117a, a first connection side 117c connecting one end of the one side 117a with one end of the other side 117b, and a second connection side 117d connecting the other end of the one side 117a with the other end of the other side 117b. In this case, each pixel P is formed in a shape of "<" having a constant area.

The one side 117a includes first and second sides S1 and S2 curved at an obtuse angle to have a shape of "<". At this time, the first and second sides S1 and S2 are inclined at a constant angle to be symmetric with each other in a vertical direction based on a bending portion where the first and second sides S1 and S2 are connected with each other, whereby the one side 117a has a shape of "<".

The other side 117b includes third and fourth sides S3 and S4 curved at an obtuse angle to have a shape of "<". At this time, the third side S3 is spaced apart from the first side S1 at a constant interval in parallel with the first side S1, and the fourth side S4 is spaced apart from the second side S2 at a constant interval in parallel with the second side S2.

The first connection side 117c connects one ends of the first side S1 and the third side S3 with each other, and the second connection side 117d connects the other ends of the first side S1 and the third side S3 with each other.

Figure 5A:
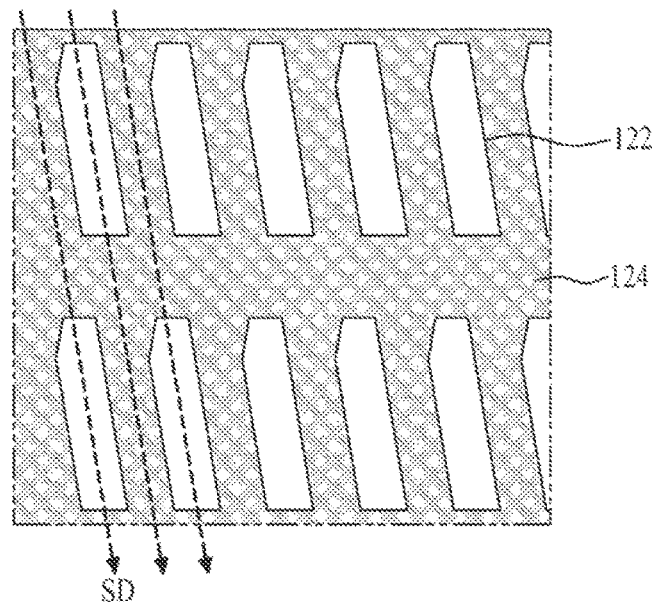
FIG. 5A is a diagram briefly illustrating a second substrate of the display panel shown in FIG. 3.
Figure 5B:
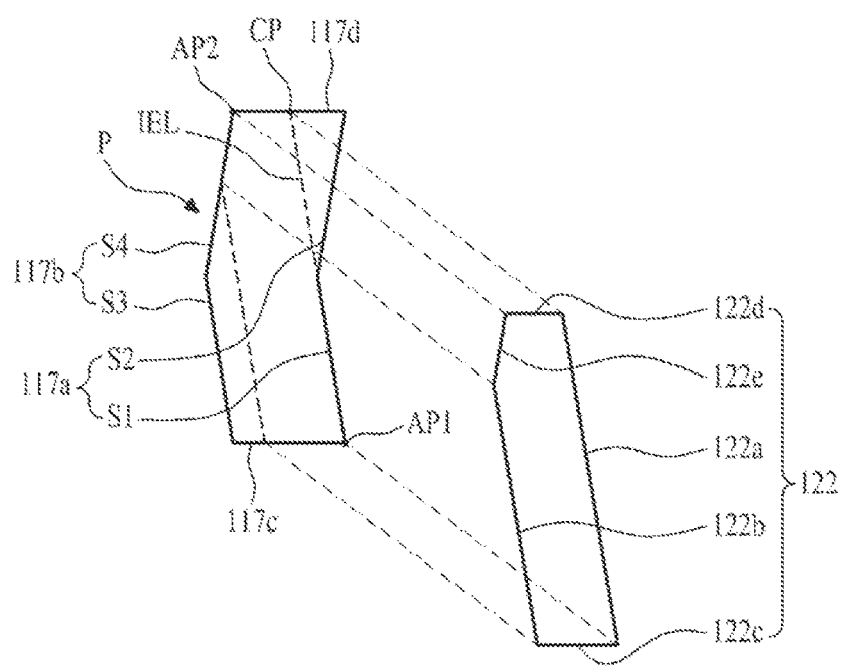
FIG. 5B is a diagram illustrating an overlap structure between a pixel shown in FIG. 4 and openings shown in FIG. 5A.

FIG. 5A is a diagram briefly illustrating one example of the second substrate of the display panel shown in FIG. 3, and FIG. 5B is a diagram illustrating an overlap structure between a pixel shown in FIG. 4 and openings shown in FIG. 5A. FIGS. 5A and 5B can illustrate main elements related to the key point(s) of the present invention, and details of other elements will be omitted.

Referring to FIGS. 5A and 5B, the second substrate 110 according to one embodiment of the present invention includes a black matrix 124 defining a plurality of openings 122, and a color filter layer (not shown) formed in the plurality of openings 122.

The black matrix 124 is formed on the second substrate 110 to include the plurality of openings 122 respectively overlapped with the plurality of pixels P, and defines an opening region of each pixel P.

Each of the plurality of openings 122 is inclined at a slope in parallel with the one side 117a of the pixel P, and may have a shape different from that of the pixel P while having an area smaller than that of the pixel P. That is, each of the plurality of openings 122 may have a pentagonal shape having five apexes overlapped on the first side S1, the fourth side S4 and the first and second connection sides 117c and 117d of the pixel P, and is formed in a vertical asymmetric structure on the basis of the center of the pixel P based on the length direction of the data line. For example, each of the plurality of openings 122 may have a pentagonal shape having first to fifth opening sides 122a, 122b, 122c, 122d and 122e.

The first opening side 122a is provided with one end overlapped on the first apex AP1 where the first side S1 meets the first connection side 117c, and the other end overlapped on the second connection side 117d of the pixel P. At this time, the other end of the first opening side 122a may be overlapped with a crossing point CP where a virtual extension line IEL extended from one end of the first side S1 in a length direction crosses the second connection side 117. This first opening side 122a may be formed between the first apex AP1 and the crossing point CP in an oblique shape of a slope parallel with the first side S1, more preferably an oblique shape matched (or overlapped) with the first side S1.

The second opening side 122b is provided with one end overlapped on the first connection side 117c and the other side overlapped on the fourth side S4 of the pixel P. At this time, the second opening side 122b is overlapped within the pixel P adjacent to the third side S3 to be parallel with the first opening side 122a (or third side). This second opening side 122b is formed between the first connection side 117c adjacent to the third side S3 and the fourth side S4 in an oblique shape of a slope parallel with the first opening side 122a (or third side), whereby an extension line of the second opening side 122b is matched with the first opening side 122a of the openings adjacent to each other in a vertical direction.

The third opening side 122c connects one end of the first opening side 122a with one end of the second opening side 122b. This third opening side 122c may be formed in a straight line shape parallel with the first connection side 117c, more preferably a straight line shape matched (or overlapped) with the first connection side 117c.

The fourth opening side 122d is provided with one end overlapped on the second apex AP2 where the fourth side S4 meets the second connection side 117d, and the other end connected to the other end of the first opening side 122a. This fourth opening side 122d may be formed between the second apex AP2 and the crossing point CP in a straight line shape parallel with the second connection side 117d, more preferably a straight line shape matched (or overlapped) with the second connection side 117d.

The fifth opening side 122e connects the other end of the second opening side 122b with one end of the fourth opening side 122d. This fifth opening side 122e may be formed between the other end of the second opening side 122b and the second apex AP2 in an oblique shape parallel with the fourth side S4, more preferably an oblique shape matched (or overlapped) with the fourth side S4.

Each of the plurality of openings 122 described as above is formed to be parallel with the slope of the one side 117a of the pixel P or to be matched with the one side 117a of the pixel P, whereby the openings 122 adjacent to each other in a vertical direction are not overlapped with each other based on a slope direction SD. For example, based on the slope direction SD of the openings 122, each of the plurality of openings 122 arranged in an odd numbered horizontal line is arranged between the openings 122 arranged in an even numbered horizontal line, whereby the openings 122 adjacent to each other in a vertical direction mutually alternate and thus are not overlapped with each other.

Figure 6:
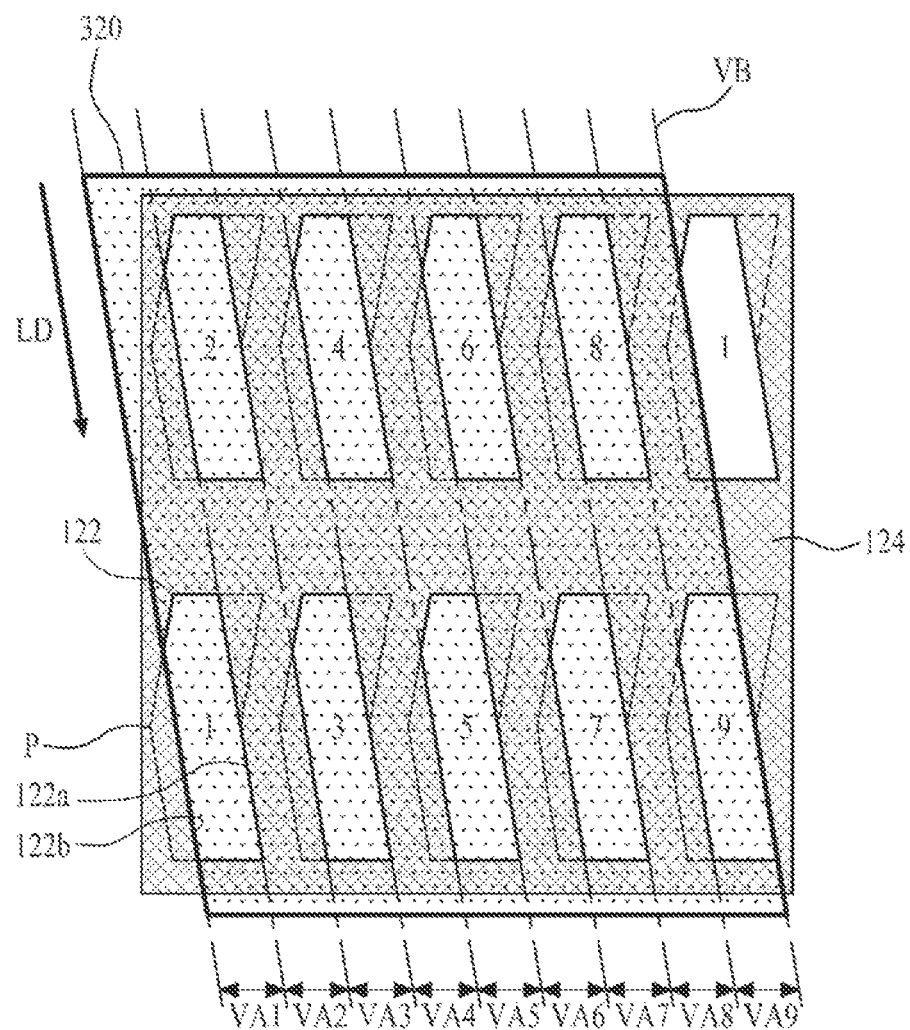
FIG. 6 is a diagram illustrating a method of realizing multi-views in a stereoscopic image display device according to one embodiment of the present invention.

FIG. 6 is a diagram illustrating a method of realizing multi-views in a stereoscopic image display device according to one embodiment of the present invention.

Referring to FIG. 6, first of all, the lenticular lens sheet 300 is arranged on the display panel 100 such that the length direction LD of the lenticular lens 320 is parallel with or matched with the slope of the openings 122. The view maps based on the multi-views are allocated to the pixels P overlapped with the lenticular lens 320, whereby the pixels display the stereoscopic images based on the allocated view maps. Accordingly, since the plurality of viewing zones VA1 to VA9 split by the lenticular lens 320 are formed along the length direction LD of the lenticular lens 320, the openings 122 of each pixel P are not overlapped with their neighboring viewing zones VA1 to VA9. In more detail, a boundary of the openings 122 overlapped with each pixel P, that is, each of the first and second opening sides 122a and 122b is matched with a boundary between the plurality of viewing zones VA1 to VA9 formed by the lenticular lens 320, whereby the openings 122 of each pixel P neither interfere with nor overlap the neighboring viewing zones VA1 to VA9.

For example, as shown in FIG. 6, if the view maps of the pixels P are set to 9 views, the length direction LD of the lenticular lens 320 may be set to a slop of Arctan (⅙). In this case, the length direction LD of the lenticular lens 320 is parallel with or matched with the slop of the openings 122, whereby the boundary of the respective openings 122 parallel with the length direction LD of the lenticular lens 320 is matched with the boundary between the first to ninth viewing zones VA1 to VA9 formed by the lenticular lens 320. As a result, the pixels P of the corresponding view maps 1 to 9 are only arranged in each of the first to ninth viewing zones VA1 to VA9, whereby the openings 122 of each pixel P neither interfere with nor overlap the neighboring viewing zones VA1 to VA9. Accordingly, the left-eye image and the right-eye image of the pixel allocated in accordance with the view maps are respectively perceived by the left eye and the right eye of the viewer located in the viewing zones VA1 to VA9. For this reason, the viewer feels three-dimensionality through binocular disparity of the left-eye image perceived by the left eye and the right-eye image perceived by the right eye.

In the aforementioned stereoscopic image display device according to one embodiment of the present invention, as the openings 122 of the pixel P are inclined at the slope to be parallel with the one side of the pixel P to have a shape different from that of the pixel P, and the lenticular lens 320 is arranged in parallel with the openings 122, the openings 122 of the pixel P do not overlap their neighboring viewing zones VA1 to VA9, whereby 3D crosstalk may be minimized or avoided, and thus display quality of the stereoscopic image may be improved. Since sum of luminance for each of the viewing zones VA1 to VA9 is uniformly obtained, luminance deviation between the viewing zones VA1 to VA9 may be minimized. Also, since the images between the viewing zones VA1 to VA9 are not overlapped with each other by being split from each other, depth of the stereoscopic image may be increased.

Figure 7A:
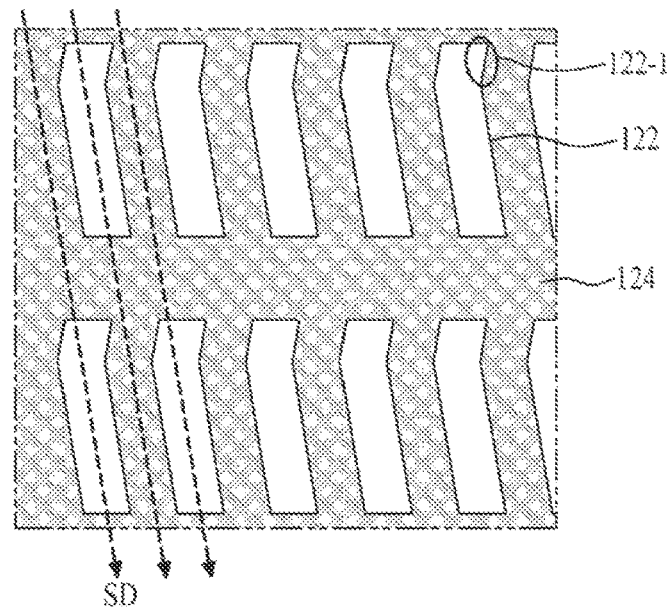
FIG. 7A is a diagram briefly illustrating a second substrate of a display panel in a stereoscopic image display device according to another embodiment of the present invention.
Figure 7B:
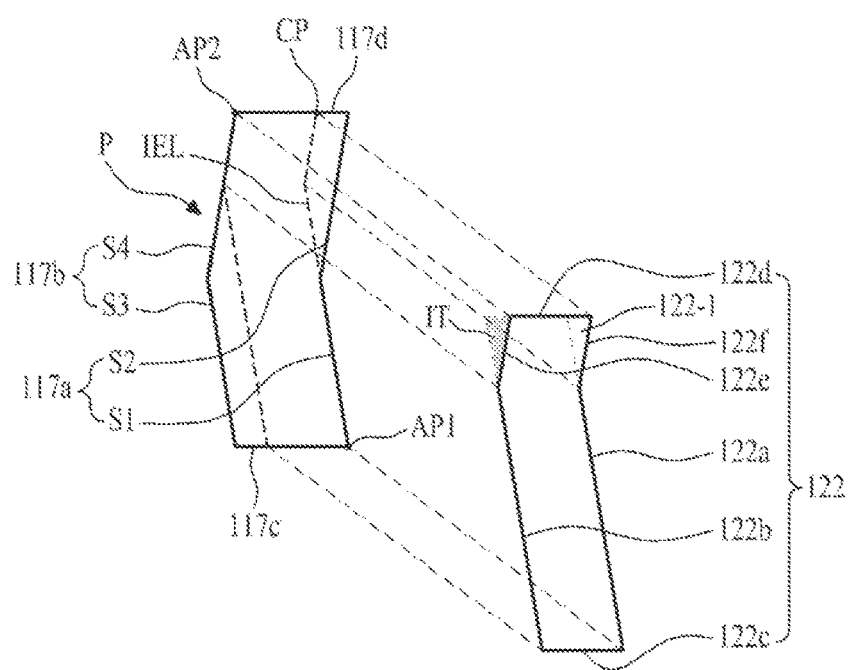
FIG. 7B is a diagram illustrating an overlap structure between a pixel shown in FIG. 4 and openings shown in FIG. 7A.

FIG. 7A is a diagram briefly illustrating one example of the second substrate of the display panel in a stereoscopic image display device according to another embodiment of the present invention, and FIG. 7B is a diagram illustrating an overlap structure between a pixel shown in FIG. 4 and openings shown in FIG. 7A. FIGS. 7A and 7B can illustrate main elements related to the key point(s) of the present invention, and details of other elements will be omitted.

Referring to FIGS. 7A and 7B, since the second substrate 110 according to another embodiment of the present invention is the same as the aforementioned second substrate except that an extension portion 122-1 is additionally formed in each of the plurality of openings 122, the repeated description of the same elements will be omitted.

Each of the plurality of openings 122 further includes an extension portion overlapped on the pixel P shown in FIG. 4 and extended towards the second side S2. Accordingly, each of the plurality of openings 122 may be formed in a hexagonal shape having five apexes overlapped on the first side S1, the fourth side S4 and the first and second connection sides 117c and 117d of the pixel P and one apex overlapped on the pixel P, and is formed in a vertical asymmetric structure on the basis of the center of the pixel P based on the length direction of the data line. For example, each of the plurality of openings 122 may have a hexagonal shape having first to sixth opening sides 122a, 122b, 122c, 122d, 122e and 122f.

The first opening side 122a is provided with one end overlapped on the first apex AP1 where the first side S1 meets the first connection side 117c, and the other end overlapped on the pixel P adjacent to the second side S2 of the pixel P. At this time, the other end of the first opening side 122a may be an end of a virtual extension line IEL extended from one end of the first side S1 in the length direction and overlapped on the pixel P adjacent to the second side S2. This first opening side 122a may be formed in an oblique shape having a slope parallel with the first side S1 while having a length longer than that of the first side S1, more preferably an oblique shape matched (or overlapped) with the first side S1.

The second opening side 122b is provided with one end overlapped on the first connection side 117c and the other side overlapped on the fourth side S4 of the pixel P. At this time, the second opening side 122b is overlapped within the pixel P adjacent to the third side S3 to be parallel with the first opening side 122a (or third side). This second opening side 122b is formed between the first connection side 117c adjacent to the third side S3 and the fourth side S4 in an oblique shape of a slope parallel with the first opening side 122a (or third side), whereby an extension line of the second opening side 122b is matched with the first opening side 122a of the openings 122 adjacent to each other in a vertical direction. Moreover, the other end of the second opening side 122b may be disposed on the same horizontal line as the other end of the first opening side 122a. In this case, the first and second opening sides 122a and 122b are formed in parallel to have the same length.

The third opening side 122c connects one end of the first opening side 122a with one end of the second opening side 122b. This third opening side 122c may be formed in a straight line shape parallel with the first connection side 117c, more preferably a straight line shape matched (or overlapped) with the first connection side 117c.

The fourth opening side 122d is provided with one end overlapped on the second apex AP2 where the fourth side S4 meets the second connection side 117d, and the other end overlapped on the second connection side 117d. This fourth opening side 122d may be formed in a straight line shape parallel with the second connection side 117d, more preferably a straight line shape matched (or overlapped) with the second connection side 117d. Additionally, the third and fourth opening sides 122c and 122d may be formed in parallel while having the same length.

The fifth opening side 122e connects the other end of the second opening side 122b with one end of the fourth opening side 122d. This fifth opening side 122e may be formed between the other end of the second opening side 122b and the second apex AP2 in an oblique shape parallel with the fourth side S4, more preferably an oblique shape matched (or overlapped) with the fourth side S4.

The sixth opening side 122f connects the other end of the first opening side 122a with the other end of the fourth opening side 122d. This sixth opening side 122f may be formed on the pixel P adjacent to the second side S2 between the other end of the first opening side 122a and the other end of the fourth opening side 122d in an oblique shape to be parallel with the fifth opening side 122e. Additionally, the fifth and sixth opening sides 122e and 122f may be formed in parallel while having the same length.

Meanwhile, the extension portion 122-1 of each of the plurality of openings 122 may be formed in a triangular shape having an apex where the fourth opening side 122d meets the sixth opening side 122f and a virtual base line extended from the other end of the first opening side 122a to the fourth opening side 122d as the bottom side. This extension portion 122-1 may have the same area as that of a virtual triangle IT having a virtual apex where an extension line extended from the other end of the second opening side 122b meets an extension line extended from one end of the fourth opening side 117d, and the fifth opening side 122e, as the bottom side.

Although each of the plurality of openings 122 described as above is the same as that according to one embodiment of the present invention except that each of the plurality of openings 122 further includes the extension portion 122-1, the entire area is increased as much as the area of the extension portion 122-1, whereby luminance of the pixel P may be increased.

Figure 8:
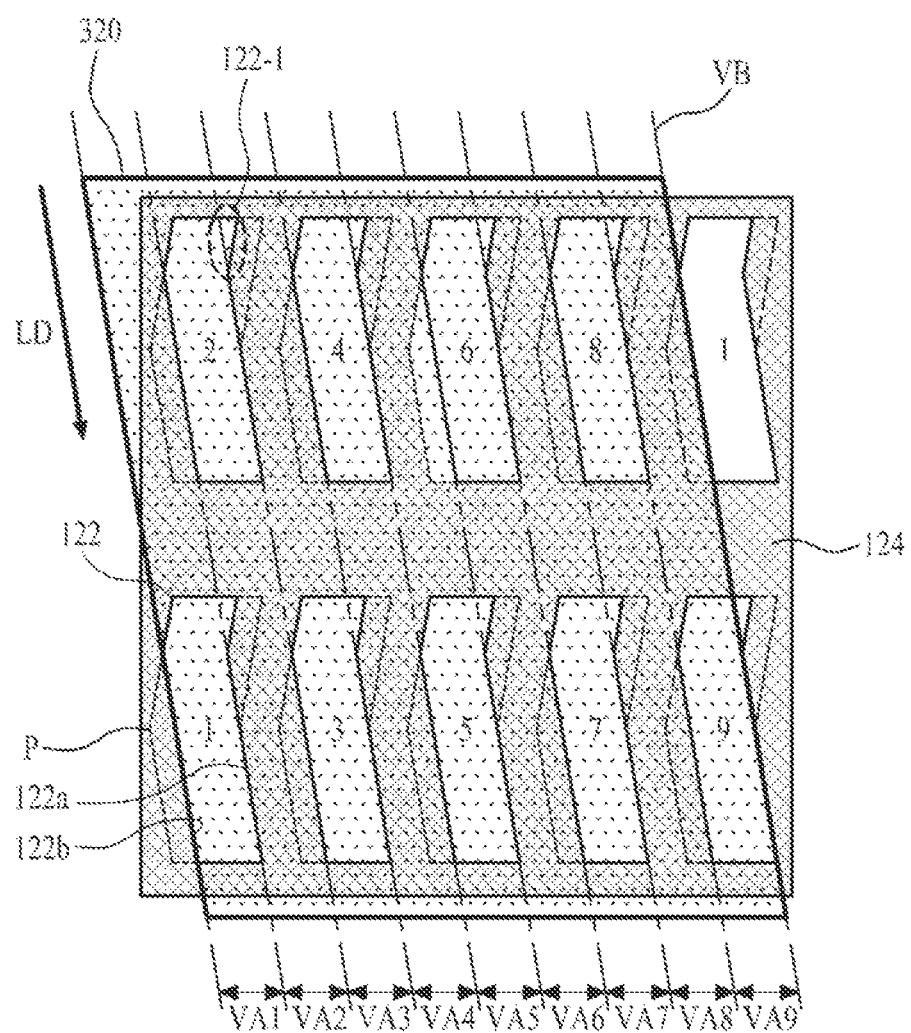
FIG. 8 is a diagram illustrating a method of realizing multi-views in a stereoscopic image display device according to another embodiment of the present invention.

FIG. 8 is a diagram illustrating a method of realizing multi-views in a stereoscopic image display device according to another embodiment of the present invention.

Referring to FIG. 8, first of all, the lenticular lens sheet 300 is arranged on the display panel 100 such that the length direction LD of the lenticular lens 320 is parallel with or matched with the slope of the openings 122. The view maps based on the multi-views are allocated to the pixels P overlapped with the lenticular lens 320, whereby the pixels display the stereoscopic image based on the allocated view maps. Accordingly, since the plurality of viewing zones VA1 to VA9 split by the lenticular lens 320 are formed along the length direction LD of the lenticular lens 320, the other regions of the openings 122 except the extension portion 122-1 of each opening 122 are not overlapped with the neighboring viewing zones VA1 to VA9. In more detail, a boundary of the openings 122 overlapped with each pixel P, that is, each of the first and second opening sides 122a and 122b is matched with a boundary between the plurality of viewing zones VA1 to VA9 formed by the lenticular lens 320, whereby the other regions of the openings 122 except the extension portion 122-1 of each opening 122 neither interfere with nor overlap the neighboring viewing zones VA1 to VA9.

For example, as shown in FIG. 8, if the view maps of the pixels P are set to 9 views, the length direction LD of the lenticular lens 320 may be set to a slop of Arctan (⅙). In this case, the length direction LD of the lenticular lens 320 is parallel with or matched with the slop of the openings 122, whereby the boundary of the respective openings 122 parallel with the length direction LD of the lenticular lens 320 is matched with the boundary between the first to ninth viewing zones VA1 to VA9 formed by the lenticular lens 320. As a result, the extension portion 122-1 of the opening 122, which is adjacent to the opening 122 of the pixel P allocated in accordance with the view maps 1 to 9 is only arranged in each of the first to ninth viewing zones VA1 to VA9, whereby the other regions of the openings 122 except the extension portion 122-1 of each opening 122 neither interfere with nor overlap the neighboring viewing zones VA1 to VA9. Accordingly, the left-eye image and the right-eye image of the pixel P allocated in accordance with the view maps are respectively perceived by the left eye and the right eye of the viewer located in the viewing zones VA1 to VA9. For this reason, the viewer feels three-dimensionality through binocular disparity of the left-eye image perceived by the left eye and the right-eye image perceived by the right eye.

In the aforementioned stereoscopic image display device according to another embodiment of the present invention, as the extension portion 122-1 of each of the plurality of openings 122 is overlapped with the neighboring viewing zones VA1 to VA9, the overlap region between the neighboring viewing zones VA1 to VA9 is generated as much as the area of the extension portion 1221, whereby 3D crosstalk equivalent to the area of the extension portion 122-1 may be generated. However, since luminance decrement corresponding to the area of the virtual triangle (IT) in each of the viewing zones VA1 to VA9 is compensated by the area of the extension portion 122-1, the sum of luminance for each of the viewing zones VA1 to VA9 is obtained more uniformly, whereby luminance deviation between the viewing zones VA1 to VA9 may be more minimized or zero.

As a result, the stereoscopic image display device according to another embodiment of the present invention may increase luminance of the stereoscopic image by additionally forming the extension portion 122-1 in each opening 122, and may minimize luminance deviation between the viewing zones VA1 to VA9 or make luminance deviation become zero.

As described above, the advantages according to one or more embodiments of the present invention may be obtained as follows.

As the opening of the pixel has a slope parallel with that of the lenticular lens, the opening of the pixel does not interfere with the neighboring viewing zone, whereby 3D crosstalk may be minimized or avoided, and thus the display quality of the stereoscopic image may be improved. Since the sum of luminance for each of the viewing zones is obtained uniformly, the luminance deviation between the viewing zones may be minimized or zero. Also, since the images between the viewing zones are not overlapped with each other by being split from each other, the depth of the stereoscopic image may be increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
   a display panel that includes a first substrate having a plurality of pixels provided in a pixel region in a curved shape and a second substrate bonded to the first substrate, the second substrate having a plurality of openings respectively overlapped with the plurality of pixels; and
   a lenticular lens sheet arranged above the display panel, and including a plurality of lenticular lenses inclined to be parallel with the plurality of openings,
   wherein each opening of the plurality of openings has an area smaller than that of a counterpart pixel of the plurality of pixels so that the each opening is entirely overlapped with the counterpart pixel,
   wherein each of the plurality of openings is inclined at a slope parallel with one side of each pixel and has a shape different than that of the pixel, the one side including first and second sides curved at an obtuse angle,
   wherein each of the plurality of openings further includes an extension portion overlapped on the pixel and extended towards the one side of the pixel, and further includes a first opening side parallel with the first side, and a sixth opening side parallel with the second side, and
   wherein the first opening side is longer than the first side, and the second side is longer than the sixth opening side.

2. The stereoscopic image display device of claim 1, wherein,
   each of the plurality of pixels is provided in a vertical symmetric structure based on its center, and
   each of the plurality of openings is provided in a vertical asymmetric structure based on the center of the pixel.

3. The stereoscopic image display device of claim 2, wherein each of the plurality of pixels further includes:
   the other side including third and fourth sides spaced apart from each other to be parallel with the one side and curved at an obtuse angle;
   a first connection side connecting the first side with the third side; and
   a second connection side connecting the second side with the fourth side.

4. The stereoscopic image display device of claim 3, wherein each of the plurality of openings is provided in an M-sided shape having N number of apexes overlapped on the first side, the fourth side, and the first and second connection sides, where N is 5 and M is a natural number equal to or greater than N.

5. The stereoscopic image display device of claim 3, wherein each of the plurality of openings further includes:
   a second opening side parallel with the third side;
   a third opening side connecting one end of the first opening side with one end of the second opening side;
   a fourth opening side parallel with the second connection side and connected to the other end of the first opening side; and
   a fifth opening side parallel with the fourth side, and connecting the other end of the second opening side with one end of the fourth opening side.

6. The stereoscopic image display device of claim 5, wherein the first opening side is overlapped with the first side.

7. The stereoscopic image display device of claim 5, wherein an extension line of the second opening side is overlapped on the first opening side of the openings adjacent to each other in a vertical direction.

8. The stereoscopic image display device of claim 5, wherein a length direction of each of the plurality of lenticular lenses is parallel with the first opening side of the opening.

9. The stereoscopic image display device of claim 8, wherein, each of the plurality of lenticular lenses provides a plurality of viewing zones along the length direction, and a boundary between the plurality of viewing zones is matched with the first opening side of the opening.

10. The stereoscopic image display device of claim 5, wherein, the third and fourth opening sides are parallel with each other and have the same length as each other, and the fifth and sixth opening sides are parallel with each other and have the same length as each other.

11. The stereoscopic image display device of claim 3, wherein the extension portion is extended towards the second side.

12. The stereoscopic image display device of claim 3, wherein each of the plurality of openings further includes:

a second opening side parallel with the third side;

a third opening side connecting one end of the first opening side with one end of the second opening side;

a fourth opening side parallel with the second connection side and connected to the other end of the first opening side; and a fifth opening side parallel with the fourth side, and connecting the other end of the second opening side with one end of the fourth opening side.

13. The stereoscopic image display device of claim 12, wherein the first opening side is overlapped with the first side.

14. The stereoscopic image display device of claim 12, wherein an extension line of the second opening side is overlapped on the first opening side of the plurality of openings adjacent to each other in a vertical direction.

15. The stereoscopic image display device of claim 12, wherein a length direction of each of the plurality of lenticular lenses is parallel with the first opening side of each opening.

16. The stereoscopic image display device of claim 15, wherein, each of the plurality of lenticular lenses provides a plurality of viewing zones along the length direction, and a boundary between the plurality of viewing zones is matched with the first opening side of each opening.

17. The stereoscopic image display device of claim 1, wherein each of the plurality of openings has the first opening side and the sixth opening side curved at an obtuse angle.

18. A stereoscopic image display device comprising:

a display panel that includes a first substrate having a plurality of pixels provided in a pixel region in a curved shape and a second substrate bonded to the first substrate, the second substrate having a plurality of openings respectively overlapped with the plurality of pixels; and a lenticular lens sheet arranged above the display panel, and including a plurality of lenticular lenses inclined to be parallel with the plurality of openings, wherein each opening of the plurality of openings has an area smaller than that of a counterpart pixel of the plurality of pixels so that the each opening is entirely overlapped with the counterpart pixel, wherein each of the plurality of openings is inclined at a slope parallel with one side of each pixel and has a shape different than that of the each pixel, the one side including first and second sides curved at an obtuse angle, wherein each of the plurality of openings further includes a first opening side parallel with the first side, and wherein the first opening side is longer than the first side.

19. The stereoscopic image display device of claim 18, wherein, each of the plurality of pixels is provided in a vertical symmetric structure based on its center, and each of the plurality of openings is provided in a vertical asymmetric structure based on the center of the each pixel.

20. The stereoscopic image display device of claim 19, wherein each of the plurality of pixels further includes:

the other side including third and fourth sides spaced apart from each other to be parallel with the one side and curved at an obtuse angle;

a first connection side connecting the first side with the third side; and a second connection side connecting the second side with the fourth side.

21. The stereoscopic image display device of claim 20, wherein each of the plurality of openings is provided in an M-sided shape having N number of apexes overlapped on the first side, the fourth side, and the first and second connection sides, where N is 5 and M is a natural number equal to or greater than N.

\* \* \* \* \*